United States Patent [19]

Chemali et al.

[11] 4,319,192

[45] Mar. 9, 1982

[54] DEEP AND/OR SHALLOW ELECTRICAL RESISTIVITY INVESTIGATION SUITABLE FOR DUAL RESISTIVITY-INDUCTION LOGGING

[75] Inventors: Roland Chemali; Jacques Tabanou, both of Chevreuse, France

[73] Assignee: Schlumberger Technology Corporation, New York, N.Y.

[21] Appl. No.: 4,621

[22] Filed: Jan. 18, 1979

[30] Foreign Application Priority Data

Jan. 21, 1978 [GB] United Kingdom ............... 2500/78
May 31, 1978 [GB] United Kingdom ............. 25094/78

[51] Int. Cl.³ .............................................. G01V 3/24
[52] U.S. Cl. ..................................... 324/375; 324/339
[58] Field of Search .......................... 324/373, 375, 339

[56] References Cited

U.S. PATENT DOCUMENTS

| | | | |
|---|---|---|---|
| 2,532,314 | 1/1952 | Doll . | |
| 2,712,627 | 7/1955 | Doll . | |
| 2,712,630 | 7/1955 | Doll . | |
| 2,880,389 | 3/1959 | Ferre et al. | 324/375 |
| 3,124,742 | 3/1964 | Schneider . | |
| 3,262,050 | 7/1966 | Threadgold et al. | 324/375 |
| 3,388,325 | 6/1968 | Birdwell et al. | 324/373 |
| 3,453,530 | 7/1969 | Attali | 324/373 |
| 3,772,589 | 11/1973 | Scholberg . | |
| 3,798,533 | 3/1974 | Schuster | 324/373 |
| 3,798,535 | 3/1974 | Schuster | 324/373 |
| 3,882,376 | 5/1975 | Schuster | 324/373 |
| 4,122,387 | 10/1978 | Ajam et al. | 324/375 |

FOREIGN PATENT DOCUMENTS

681681 10/1952 United Kingdom .
986572 3/1965 United Kingdom .
1310141 3/1973 United Kingdom .

*Primary Examiner*—Gerard R. Strecker
*Attorney, Agent, or Firm*—Henry N. Garrana; David H. Carroll

[57] ABSTRACT

A dual resistivity and induction apparatus for the investigation of earth formations traversed by a borehole, comprises an electrode system, supported on a support member, comprising a central electrode and five pairs of electrodes respectively short-circuited and aligned symmetrically about the central electrode at increasing distances therefrom; the central electrode and the electrodes of the fourth and fifth pairs are called current electrodes, the electrodes of the first, second and third pairs are called voltage electrodes; a source of alternating current at a first frequency, $f_1$, is coupled between the electrodes of the fifth and fourth pairs; a source of alternating current at a second frequency, $f_2$, is coupled between the electrodes of the fifth pair and an electrode at electrical infinity with respect to the electrode system; a circuit arrangement coupled to the electrodes of the fourth pair for generating current at $f_1$ from the central electrode for maintaining the potential difference between the first and second pairs of electrodes at substantially zero and for generating current at $f_2$ from the central electrode for maintaining the potential difference between the first and third pairs of electrodes at substantially zero; first and second impedances, respectively interposed between each of the source of alternating current and the current generating circuit and the fourth pair of current electrodes; and transmitter and receiver coils supported on the support member, for inducing at a third frequency, $f_3$, electromagnetic energy; the length, along the axis of the support member, of each of the electrodes of the fifth pair is several orders of magnitude smaller than the relative spacing along the support member of that fifth pair of electrodes to reduce the interference between the electrode system and the coil system.

33 Claims, 8 Drawing Figures

DEEP AND/OR SHALLOW ELECTRICAL RESISTIVITY INVESTIGATION SUITABLE FOR DUAL RESISTIVITY-INDUCTION LOGGING

BACKGROUND OF THE INVENTION

1. Field of Invention

The present invention relates in general to electrical well logging, and pertains in particular to improved method and apparatus for simultaneously investigating underground formation zones which are near and far from a borehole that traverses the formation zones, which method and apparatus are compatible for use along with induction logging method and apparatus.

2. The Prior Art

It has been the practice to investigate earth formations surrounding a borehole by lowering a sonde in the borehole so as to measure characteristics of the traversed formation such as conductivity, resistivity, porosity, etc. The formation conductivity is mainly measured by generating in the formation coil-induced electromagnetic currents and thereafter detecting with receiving coils magnetic fields generated by the induced currents. Such an apparatus is commonly called an induction sonde and the recording of the measurements versus depth is called an induction log. Reference may be had to U.S. Pat. No. 2,582,314 granted to Henri G. Doll on Jan. 15, 1952, and assigned to the Schlumberger Technology Corp. for a description of such an apparatus.

Likewise it is known that formation resistivity measurements are obtained by passing survey electrical currents through the formation via electrodes and measuring voltages between certain of the electrodes. In order to minimize the influence of the borehole and those portions of the formation which are close to the wall of the borehole, the survey current is focused into the formations by means of special electrodes to provide a mode of operation known as deep investigation as opposed to unfocused shallow investigation. Such a focusing electrode logging tool has been described in U.S. Pat. No. 2,712,627 granted to H. G. Doll on July 5, 1955 and assigned to the Schlumberger Technology Corp.

It is well known that there are domains of resistivity in which induction measurements are better suited than resistivity measurements and vice versa. For example, when the ratio $R_t/R_m$ is much greater than 1, such as in salty muds and/or in highly resistive formations, resistivity measurements are preferred; $R_m$ commonly designates the resistivity of drilling mud in the borehole, $R_{xo}$ the resistivity of the formation zone directly adjacent to the borehole and invaded by mud filtrate, and $R_t$ the resistivity of the uninvaded formation zone. On the contrary, when $R_t$ is smaller than $R_m$ or $R_{xo}$, induction measurements are more satisfactory. Therefore, it has been suggested to combine on one sonde the focusing-electrode system of a resistivity sonde with a coil system of a conductivity or induction sonde. Such a system has been described in U.S. Pat. No. 3,124,742 granted to William P. Schneider on Mar. 10, 1964 and assigned to the Schlumberger Technology Corp. This patent describes a "resistivity-induction tool" allowing for the simultaneous recording of a resistivity log and an induction log on the same trip of the sonde through a well bore.

The main difficulty encountered in mounting together, in an interlaced manner, an electrode system and a coil system, arises from the sensitivity of the responses of the coils to the presence of conductive electrodes in close proximity therewith. Consequently, the number of electrodes of the sonde described in the Schneider patent, although fairly large, is minimized, and electrodes having large surfaces have been avoided. More precisely, the focusing-electrode system of the Schneider patent comprises a central current electrode $A_o$, two pairs of monitoring electrodes $M_1-M'_1$ and $M_2-M'_2$, one pair of auxiliary current electrodes $A_1-A'_1$ and one current return electrode $B$ located on the sonde. The depth of investigation of such a system is shallow, due on the one hand to the small surface size and short spacing of the electrodes, and on the other hand to the location of the current return electrode $B$ on the sonde. This arrangement presents a serious drawback since only a shallow investigation is possible whereas a deep investigation is often additionally required, especially when $R_t$ and $R_{xo}$ are substantially different.

Relatively deep and shallow depths of investigation can be simultaneously obtained with a known type of dual focusing-electrode system, called "Dual resistivity" and described in U.S. Pat. No. 2,712,630 granted to Henri G. Doll on July 5, 1955, and in U.S. Pat. No. 3,772,589 granted to Andre Scholberg on Nov. 13, 1973 (the two patents are assigned to the Schlumberger Technology Corp.). The dual resistivity system operates at two different frequencies $f_1$ and $f_2$ and comprises two current return electrodes, one on the sonde for the shallow investigation and one at the surface for the deep investigation. Besides, as shown in the Scholberg patent, the current return electrodes of the shallow investigation electrode system $A_2-A'_2$, are used as auxiliary current electrodes for the deep investigation electrode system. These electrodes, however, are of a large size, in order to increase the depth of investigation, and therefore cannot be used in a combined dual resistivity-induction sonde without introducing large adverse effects into the operation of the coil system.

Additionally, it is the current practice to record along with the resistivity measurements the difference between the potential of an electrode in the borehole and a fixed potential of a surface electrode, commonly known as "spontaneous potential". Large size metallic electrodes employed for the deep investigation give rise to erroneous measurements of the spontaneous potential.

SUMMARY OF THE INVENTION

It is an object of the present invention to provide a new logging method and a new electrode array for independent use or for use in combination with a coil system of a logging sonde, which simultaneously enable deep and shallow investigation of formations surrounding a borehole. It is a further object of the present invention to provide a novel electrode array that does not disturb the simultaneous recording of a spontaneous potential measurement. The total length of the novel electrode array is configured to be sufficiently short so that a sonde equipped with such an array can easily be handled thus enhancing the ability of mounting such an array on the support member of a common induction sonde.

Yet another object of the present invention is the provision of a logging sonde comprising a novel electrode system fixed on the support member of an induction sonde in close proximity to the coils of the induction sonde. This combined system, enables the simultaneous recording of a conductivity curve and two resistivity curves at different depths of investigation of the formation within the same horizontal layer of the formation.

In accordance with a first embodiment of the present invention, a well-logging method for measuring the electrical resistivity of two underground formation zones respectively near and far from a borehole, comprises the following steps:

applying at a first location of the borehole and receiving at two second locations of the borehole symmetrically situated on both sides of the first location, a first measurement current at a first frequency, applying at two third locations of the borehole symmetrically situated on both sides of the first location, between the second locations, and receiving at the second locations, a first focusing current at the first frequency, varying the amplitude of the first measurement current so as to minimize the potential difference existing at the first frequency between respective ones of two fourth and two fifth locations of the borehole symmetrically situated in respective order on both sides of the first location, between the two third locations, deriving from the amplitude of the first measurement current and the potential difference existing at the first frequency between the two fourth locations and a sixth location which is remote from the aforementioned first through fifth locations a measure of the resistivity of a formation zone near the borehole, applying at the first location and receiving at a seventh location on the surface, a second measurement current at a second frequency, applying at the second locations and receiving at the seventh location a second focusing current at the second frequency, varying the amplitude of the second measurement current so as to minimize the potential difference existing at the second frequency between respective ones of the two fourth locations and two eighth locations respectively situated symmetrically on both sides of said first location between the third and fourth locations, and deriving from the amplitude of the second measurement current and the potential difference existing at the second frequency between the fourth locations and the sixth location a measure of the resistivity of a formation zone far from the borehole, wherein the two second locations have a dimension along the borehole axis which is small relative to their spacing distance, the eighth locations are placed midway between the third and fifth locations, and the amplitude of the second measurement current detected at the third locations is minimized.

The well-logging method according to the present invention makes it possible to achieve a double result. First of all, one obtains, with a very good vertical resolution, a good measurement of the resistivity of the formation zones near the borehole as long as the contrast between the resistivity of the uninvaded formation zone and that of the mud filtrate is small (less than about one thousand) and the diameter of the borehole near the sonde does not greatly vary from its nominal diameter (factor of two maximum). Additionally, one obtains, also with a good vertical resolution, a good measurement of the resistivity of the uninvaded formation zones, as long as the mud filtrate invasion depth remains small relative to the extreme spacing of the second locations (i.e. no more than two-thirds). If this double result is compared with the one provided by the prior-art method (Scholberg patent) in which the dimension along the borehole axis of the second location is comparable in length to their relative spacing, the following is noted. Firstly, in addition to the easier implementation due to the size reduction, the quality of a resistivity measurement in a formation zone near the borehole is hardly modified and, secondly, the compromise between increasing the mud filtrate invasion sensitivity of the resistivity measurement in the uninvaded zone, on the one hand, and the reduction in the vertical sensitivity of this measurement, on the other hand, is altogether acceptable.

In accordance with another embodiment of the present invention, a well-logging method following the principles described with respect to the first embodiment comprises the following additional steps:

inducing into the formation zones electromagnetic energy at a third frequency much higher than the first and the second frequency measuring the currents at the third frequency thus induced into the formation zones and deriving therefrom a value of the conductivity of these formations, and modifying the flow conditions of the focusing and measurement currents at the first and at the second frequency by providing independent flow paths at each of said two third locations for each of said focusing currents and said measurement currents.

Therefore, it becomes possible, while measuring the conductivity of the formations electromagnetically, to carry out electrical measurement of the resistivity of two zones of the formation in accordance with the disclosure of the first embodiment of the present invention.

DETAILED DESCRIPTION

Figure 1:
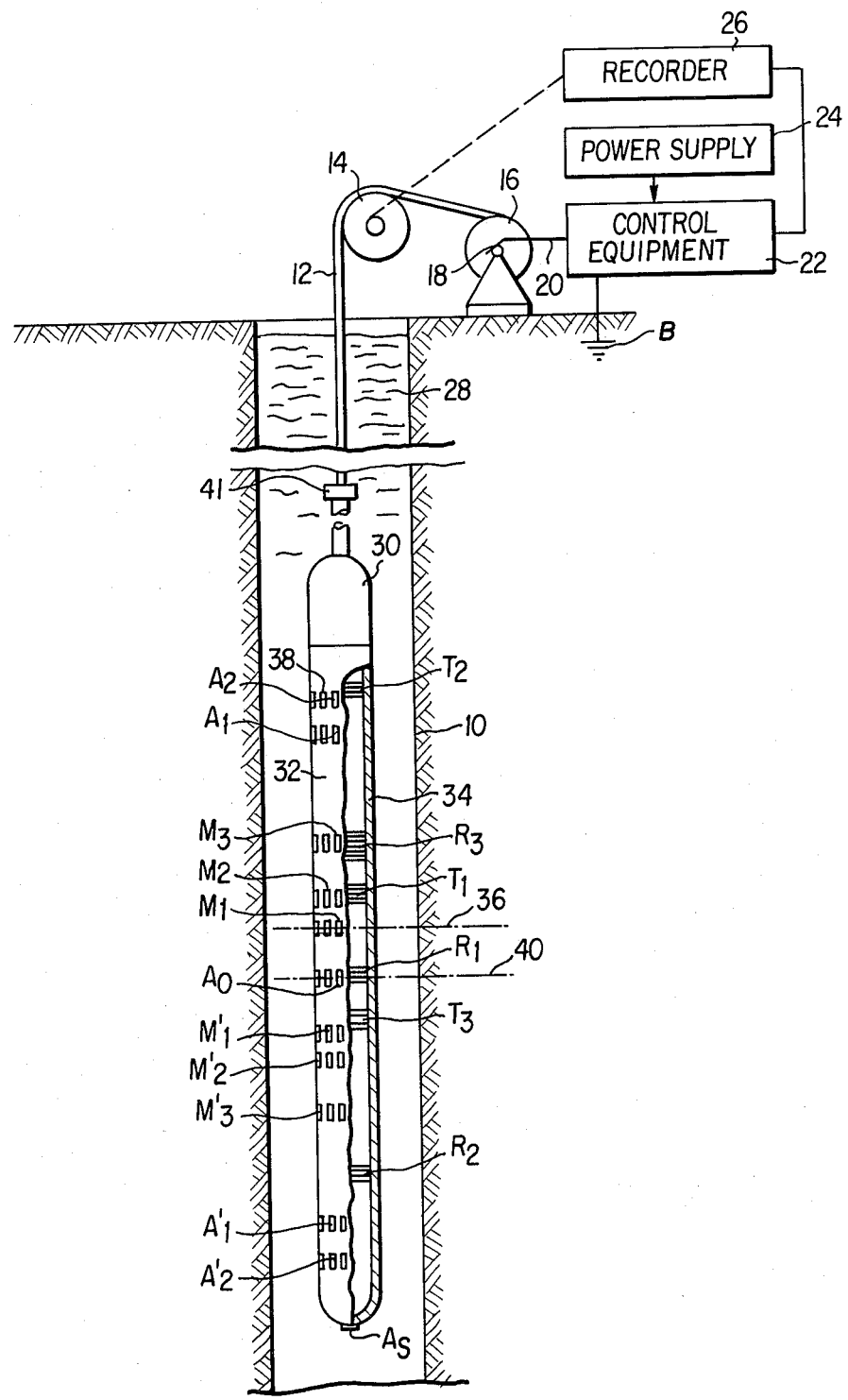
FIG. 1 is an elevational view of a representative embodiment of a well logging sonde comprising an induction sonde supporting an electrode system in conformity with the invention, said sonde having a portion cut away to reveal the coils of the induction system.

Referring to FIG. 1 of the drawings, there is shown a representative embodiment of an apparatus or sonde for investigating earth formations traversed by a borehole 10. The apparatus is suspended in the borehole at the extremity of a multi-conductor cable 12, which passes over a pulley 14. The sonde can be lowered or raised in the borehole with the help of a conventional winch 16. The conductors in the cable 12 may be connected through slip rings 18 and conductors 20 to surface control equipment 22. The necessary power to operate the downhole electronic equipment may be supplied by a power supply 24 at the surface. The electrical indications obtained in the borehole may also be recorded at the surface on conventional recording means 26 connected to the control equipment 22 and mechanically driven from the pulley 14 so as to record measurements as a function of depth. The borehole 10 contains drilling mud 28.

The sonde has two main parts: an upper part comprising an electronic cartridge 30 and a lower part 32 on which a coil system and an electrode system are supported. The electronic cartridge 30 comprises electronic circuitry associated with both the coil system and the electrode system and is provided with a housing made of an electrical insulating material which is also pressure-resistant and fluid-tight.

The lower part 32 of the sonde is formed by a support member 34 made of a non-conductive and non-magnetic material, such as a plastic impregnated fiberglass. Secured to the support member is the coil system which can be one of the systems described in the Doll U.S. Pat. No. 2,582,314. For example, the coil system shown in FIG. 1 comprises a principal transmitter coil $T_1$, an auxiliary focusing transmitter coil $T_2$, a receiver coil $R_1$ and a focusing receiver coil $R_2$ as well as an auxiliary compensating transmitter coil $T_3$ located between the receiver coils $R_1$ and $R_2$ and an auxiliary compensating receiver coil $R_3$ placed between the transmitter coils $T_1$ and $T_2$. The coils are secured along the length of the support member substantially symmetrical with respect to the axis 36 thereof.

The electrodes of the electrode system are each formed of a plurality of conductive strips of small surface areas which are connected together by a resistive ring. The conductive strips are in contact with the mud while the ring is embedded in an insulating material. The electrodes may be printed circuits realized on a flexible support, in plastic for example. The structure of the electrodes, fully described in the Schneider patent, has the advantage of making them more resistive to the electrical current induced by the coils than the usual electrodes formed by a single sleeve of conductive material. In order to reduce interference between the two systems, the position of the strip electrodes with regard to the position of the coils is chosen by carrying out a method described in the already mentioned Schneider patent. This method consists of investigating the response of the coil system to an elemental closed loop conductor moved along and around the coil system. The output signal of such a coil system is plotted versus the position of the loop conductor along the coil system and the position of the electrodes is selected at the locations where the output signal is minimal. The electrode array, as shown in FIG. 1, is composed of a survey electrode $A_o$ located along axis 40 and five pairs of electrodes symmetrically located with respect thereto. A reference electrode 41 is remotely located at some twenty meters from the sonde on an isolated section of the cable 12. The first three pairs of electrodes surrounding survey electrode A are monitoring electrode pairs $M_1$-$M'_1$ $M_2$-$M'_2$ and $M_3$-$M'_3$. The two other pairs are auxiliary current emitting electrodes $A_1$-$A'_1$ and $A_2$-$A'_2$.

For usual boreholes (diameter length between 200 and 250 mm) the diameter of the sonde is around 90 mm and the length of current electrodes is about 80 mm while the length of the voltage electrodes is smaller. For such an electrode array as shown in FIG. 1, a desirable spacing has been found to be: $A_o$ to $M_1$-$M'_1$: 305 mm; $A_o$ to $M_2$ or $M'_2$: 423 mm; $A_o$ to $M_3$-$M'_3$: 838 mm; $A_o$ to $A_1$-$A'_1$: 1,219 mm and $A_o$ to $A_2$-$A'_2$: 1,473 mm. The spacing distance between axis 40 of the electrode system and axis 36 of the coil system can be about 250 mm. It will be appreciated that the length of the electrode array is small enough so that the electrode system can be mounted on the support member of most of the induction logging sondes presently used. Moreover, the electrode array of the present invention can be mounted on a separate mandrel and used independently of any coil system to provide a dual focusing-electrode system sonde having a relatively short length. An electrode $A_s$ located on the bottom of sonde part 32 is provided in conjunction with surface electrode B to enable the measurement of the spontaneous potential of earth formation therebetween.

Figure 2:
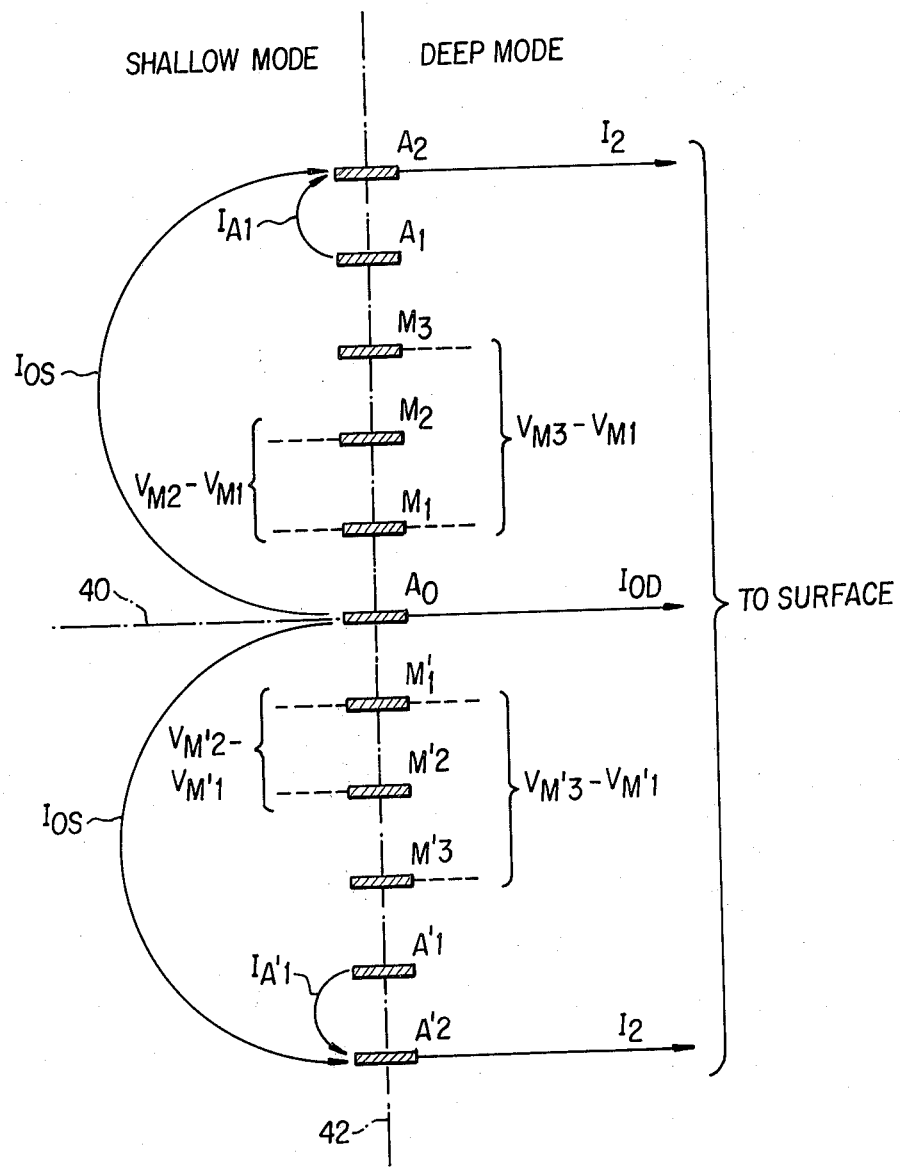
FIG. 2 illustrates schematically the two modes of operation (shallow and deep investigation) of the new electrode array of FIG. 1.

The operation of the electrode array of FIG. 1, is schematically illustrated in FIG. 2. Electrodes are represented along the longitudinal axis 42 of the support member. The left and right sides of FIG. 2 respectively illustrate the operation of the shallow and deep investigation modes of the electrode system. In both modes of operation, survey electrode $A_o$ emits simultaneous survey currents into the adjacent formation which are designated $I_{OD}$ for the deep survey current and $I_{OS}$ for the shallow survey current. The respective frequencies of the shallow and deep survey current can be 280 Hz and 35 Hz. Electrodes of the same symmetrically located pair may be electrically strapped or, preferably, kept at the same potential by electronic means.

In the shallow mode of investigation, the pair of monitoring electrodes $M_3$ and $M'_3$ are not used; only monitoring pairs $M_1$, $M'_1$ and $M_2$, $M'_2$ are used. The potential difference $V_{M2}-V_{M1}$ between electrodes $M_2$ and $M_1$ is kept substantially equal to the potential difference $V_{M'2}-V_{M'1}$ between electrodes $M'_2$ and $M'_1$ by controlling the amplitude of the measure current $I_{OS}$ emitted by the central electrode $A_o$ and received by the auxiliary electrodes $A_2$ and $A'_2$ respectively. Besides, as explained in the Scholberg patent, the focusing current generated between electrodes ($A_1$-$A'_1$) and ($A_2$-$A'_2$) is controlled such that the total electric power ($V_{M1} \cdot I_{OS}$) is kept substantially constant, the potential $V_{M1}$ being measured with respect to the reference electrode 41.

A convenient way to monitor the measurement current $I_{OS}$ is to have $V_{M2}-V_{M1}+V_{M'1}-V_{M'2}=0$. The value of the resistivity $R_S$ of the investigated formation adjacent the borehole, for a shallow depth of investigation, is then obtained by the following equation:

$$R_S = k_1 \frac{V_{M1} + V_{M2} + V_{M'1} + V_{M'2}}{4 I_{OS}}$$

where $k_1$ is a constant geometrical factor of the shallow investigation system. However, when the monitoring loop is efficient enough to keep $V_{M1}=V_{M2}$ and $V_{M'1}=V_{M'2}$, the resistivity $R_S$ is obtained by the simplified equation:

$$R_S = k_1 \frac{V_{M1} + V_{M'1}}{2 I_{OS}}$$

This resistivity $R_S$ is substantially that of a formation bed the thickness of which is the distance between electrodes $M_1$-$M'_2$. As the distance $A_o$-$M_1$ is substantially equivalent to the borehole diameter, the position of the tool within the borehole does not substantially affect the shallow resistivity measurement $R_S$.

During operation in the deep investigation mode, an auxiliary focusing current $I_2$ is emitted through the pair of electrodes $A_2$ and $A'_2$. Deep survey or measure current $I_{OD}$ and auxiliary current $I_2$ return to the surface to be received by a surface electrode B (shown in FIG. 1). The value of measure current $I_{OD}$ is controlled so as to maintain the potential difference $V_{M3} - V_{M1}$ between electrodes $M_3$ and $M_1$ substantially equal to the potential difference $V_{M'3} - V_{M'1}$ between electrodes $M'_3$ and $M'_1$. It can be shown that, in that case, currents $I_2$ and $I_{OD}$ are forced to penetrate into the formation in a direction which is substantially perpendicular to the longitudinal axis of the logging sonde and therefore, when the sonde is not tilted in the borehole, perpendicular to the longitudinal axis of the borehole. As a consequence, the depth of investigation is larger than that obtained during operation in the shallow investigation mode. Actually the measured deep resistivity $R_D$ is close to the resistivity $R_t$ of the non-invaded zone as long as the invasion depth is about twice shorter than the span between electrodes $A_2$, $A'_2$. This condition is obtained in about 80% of the cases. For the deep investigation system, the total current (at 35 Hz) circulating between the remote return electrode and the sonde current electrodes is controlled by means of a feed-back loop in order to keep constant the total electric power at that frequency applied to the formations.

A practical way to implement the monitoring of the measurement current $I_{OD}$ is to have $V_{M3} - V_{M1} + V_{M'1} - V_{M'3} = 0$. The resistivity $R_D$ of the formations surrounding the borehole, for a deep investigation mode of operation, is given by the following equation:

$$R_D = k_2 \frac{V_{M1} + V_{M3} + V_{M'1} + V_{M'3}}{4 I_{OD}}$$

where $k_2$ is a constant geometrical factor of the deep investigation system.

When the monitoring loop is efficient and fast enough to keep $V_{M1} = V_{M3}$ and $V_{M'1} = V_{M'3}$, the value $R_D$ is obtained by the simplified equation:

$$R_D = \frac{K_2(V_{M1} + V_{M'1})}{2 I_{OD}}$$

This resistivity $R_D$ is substantially that of a formation bed the thickness of which is the distance between electrodes $M_1$-$M'_3$.

Figure 3C:
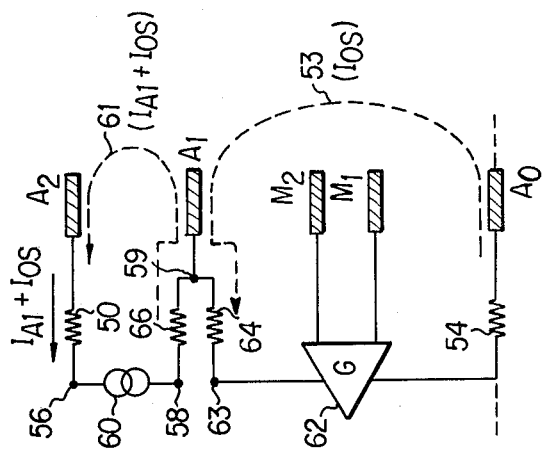
FIGS. 3A, 3B and 3C represent schematically one-half of the symmetrical electrode array of FIG. 1, and its associated circuits for shallow investigation, FIG. 3A showing the theoretical circuit, FIG. 3B showing the measurement circuit equivalent and FIG. 3C showing the circuit of the invention.
Figure 3B:
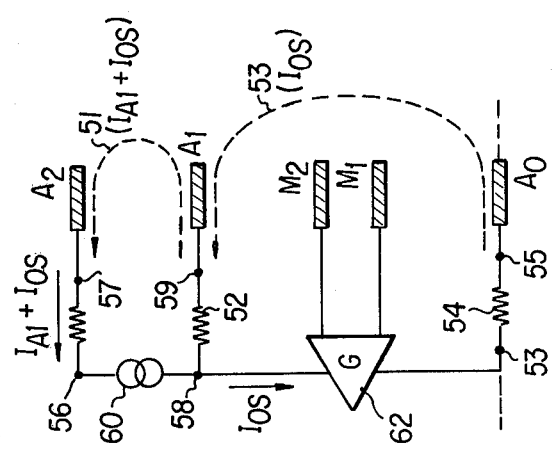
Figure 3A:
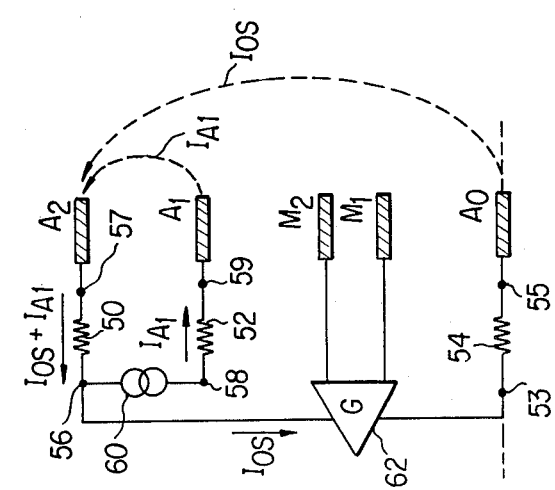

FIG. 3A represents, schematically, one-half of the shallow electrode array of FIG. 1, and its associated circuits. Electrodes $A_o$, $A_1$ and $A_2$ are connected respectively to impedances 50, 52 and 54, each of which comprises on the one hand a resonant circuit formed by an inductor and a capacitor connected in parallel and on the other hand a resistive ring. Briefly, the electrodes are made of longitudinal strips connected to each other by a small resistance in order to form a resistive ring having a small resistance (0.5Ω) for the currents at the first and second frequencies. The resistive ring provides a noticeable resistance (5Ω) for the currents induced at the third frequency. The resistive ring and the resonant circuit as combined form a selective composite impedance having a value which is low (about 0.5Ω) at the first and the second frequencies (280 Hz and 35 Hz) respectively used for the shallow and the deep resistivity measurements and which is much higher (about 1,000Ω) at the third frequency (20 KHz) used for the induction measurements. A more detailed description is provided below in connection with FIG. 6.

Two terminals 56 and 58 of an adjustable current source 60 operating at the first frequency (280 Hz) are respectively connected to one end of the impedances 50 and 52, the other terminals 57 and 59 of the impedances are respectively connected to electrodes $A_2$ and $A_1$. A tuned monitoring amplifier 62 having a gain G at the first frequency and a minimal gain at other frequencies, has two input terminals respectively connected to monitoring electrodes $M_1$ and $M_2$ and two output terminals connected to terminals 56 and 53 of impedances 50 and 54 respectively. The other terminal 55 of impedance 54 is connected to electrode $A_o$.

In the configuration of FIG. 3A, the focusing current $I_{A1}$ is supplied by current source 60 through electrode $A_1$ and is received at electrode $A_2$. Survey or measure current $I_{OS}$ is emitted from electrode $A_o$ and collected at electrode $A_2$. The intensity and phase of current $I_{OS}$ are controlled through monitoring amplifier 62 to keep voltages $V_{M1}$ and $V_{M2}$ of monitoring electrodes $M_1$ and $M_2$ at substantially the same value. Additionally, the intensity of focusing current $I_{A1}$ is controlled so as to keep substantially constant the product of the measure voltage $V_{M1}$ of electrode $M_1$ (taken vis-a-vis the reference electrode 41) and the measure current $I_{OS}$. A drawback of the circuit of FIG. 3A stems from the fact that impedance 50 is traversed by a current $(I_{OS} + I_{A1})$, where the intensity of the focusing current $I_{A1}$ is generally 100 or 1000 times higher than the intensity of the measure current $I_{OS}$. As a consequence, an important drop of potential occurs in impedance 50. This spurious drop of potential has to be compensated for by monitoring amplifier 62 and therefore its gain G has to be high leading to loop instability. According to the present invention the circuit represented in FIG. 3C has been designed and implemented to prevent such loop instability. The circuit of FIG. 3B is provided as an intermediate step toward the actual circuit of the invention shown in FIG. 3C.

In FIG. 3B, the output terminal of amplifier 62 previously connected to terminal 56 of current source 60, is connected to the other terminal 58 of source 60. Thusly, the measure current $I_{OS}$ is received at electrode $A_1$ instead of at electrode $A_2$. If $I_{A1}$ still designates the focusing current flowing through impedance 52 and electrode $A_1$, then the intensity of the measure current circulating in the loop 53 is $I_{OS}$ and that of the total current circulating in the loop 51 is $(I_{A1} + I_{OS})$. It can be noticed that monitoring amplifier 62 still has to overcome a high drop of potential in impedance 52 through which flows current $I_{A1}$.

In can be demonstrated by applying the principle of superposition that the circuit of FIG. 3B works as if survey or measure current $I_{OS}$ were received at electrode $A_2$. Another way of understanding the equivalence of the circuits of FIG. 3A and 3B, is to look at the influence of the currents emitted or received by each electrode on the resistivity measurement, therefore on the potential of monitoring electrodes $M_1$ and $M_2$. The measure current emitted by electrode $A_o$ is $+I_{OS}$ in both circuits. Focusing currents flowing from electrode $A_1$ is $I_{A1}$ for the circuit of FIG. 3A and $+(I_{A1}+I_{OS})-I_{OS} = +I_{A1}$ for the circuit of FIG. 3B. As far as electrode $A_2$ is concerned the total current flow is $-(I_{OS}+I_{A1})$ in both cases. The value and the sign (for direction of flow) of the current of each electrode being the same in both circuits, these circuits are equivalent.

The circuit represented in FIG. 3C is identical to the one of FIG. 3B except that instead of having one selective impedance 52 connected between electrode $A_1$ and terminal 58, it comprises, in accordance with principles of the present invention, two independent selective circuits connected in parallel to electrode $A_1$. Impedance 64, connected between electrode $A_1$ and an output terminal 63 of amplifier 62, provides a path for current $I_{OS}$ while impedance 66, connected between the current source 60 and electrode $A_1$, provides a path for current $(I_{A1}+I_{OS})$. It will be appreciated that loop 53 formed by electrode $A_1$, impedance 64, amplifier 62, impedance 54, electrode $A_o$ and the formation provides a flow path for the current $I_{OS}$. Similarly, loop 61 formed by electrodes $A_1$, $A_2$, impedance 50, current source 60, the formation and impedance 66 provides a flow path for current $(I_{A1}+I_{OS})$.

Keeping in mind the fact that the intensity of focusing current $I_{A1}$ is several hundred times larger than the intensity of measure current $I_{OS}$, one realizes that the high spurious drop of potential across impedance 50 (FIG. 3A) and impedance 52 (FIG. 3B), for which amplifier 62 had to compensate, is not present across impedance 64 in FIG. 3C. Therefore, in the circuit of FIG. 3C, the gain G of monitoring amplifier 62 does not have to be inordinantly large to compensate therefor. The two separate flow paths for the connections to the electrode $A_1$ effect a suppression of the adverse coupling between the measure current $I_{OS}$ produced by monitoring amplifier 62, and the focusing current produced by current source 60.

Figure 4:
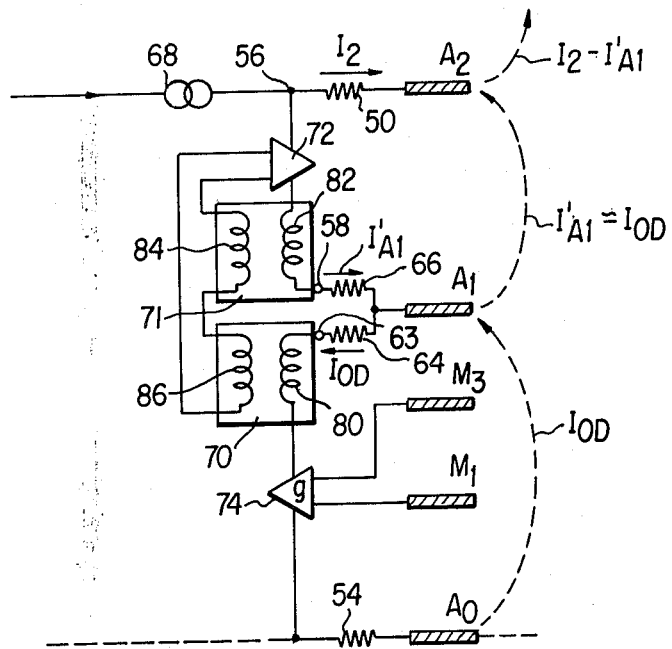
FIG. 4 represents schematically one-half of the symmetrical electrode array of FIG. 1, and its associated circuit for deep investigation.

FIG. 4 represents one-half of the electrode array of FIG. 1, with its associated circuits for deep investigation of the earth formations. A current source 68 supplies a current $I_2$ between the remote return electrode B located at the surface and the sonde current electrodes $A_o$, $A_1$ and $A_2$. Electrode $M_3$ is connected to one of two input terminals of another tuned monitoring amplifier 74 having a gain G at the second frequency (35 Hz) and a minimal gain at other frequencies. Another input terminal of amplifier 74 is connected to electrode $M_1$. In association with the above circuits, a compensation device is used which comprises: two current transformers 70-71 and an amplifier 72 tuned to the deep investigation frequency. A primary winding 80 of transformer 70 is connected between terminal 63 of impedance 64 and one output terminal of amplifier 74 while a primary winding 82 of transformer 71 is connected between terminal 58 of impedance 66 and one output terminal of amplifier 72, the other output terminal of the amplifier 72 is connected to terminal 56 of impedance 50. The secondary windings 84 and 86 of transformers 70 and 71 are respectively connected in series and in phase opposition to the input terminals of amplifier 72.

In the theoretical working of the electrode array for a deep investigation of the earth formations, total current (the measure current $I_{OD}$ plus the focusing current) is supplied by current source 68 and emitted into the formations. The measure current $I_{OD}$ is emitted from electrode $A_o$ and returned to the surface and the intensity of current $I_{OD}$ is controlled by monitoring amplifier 74 so as to keep the voltages $V_{M1}$ and $V_{M3}$ of electrodes $M_1$ and $M_3$ at substantially the same value. Furthermore, the total current supplied by source 68 is advantageously adjusted so as to keep approximately constant the value of the electrical power $I_{OD} \cdot V_{M1}$.

In the practical implementation shown in FIG. 4, the measure current $I_{OD}$ is virtually returned at electrode $A_1$ and an auxiliary current $I'_{A1}$ is emitted from electrode $A_1$ and collected at electrode $A_2$. Because of the principle of superposition it can be demonstrated that, for sufficiently high gains of monitoring amplifier 74 and amplifier 72, the theoretical configuration (not shown) and the practical configuration (FIG. 4) are practically equivalent. One can see that the deep investigation current $I_{OD}$ is emitted by electrode $A_o$ and a current $I'_{A1}$ flows through impedance 66 and is emitted from electrode $A_1$. Therefore, the focusing current emitted by electrode $A_2$ towards the surface is $(I_2 - I'_{A1})$.

In the deep investigation mode, electrode $A_1$ should not transmit any current (at 35 Hz) into the formations. To comply with this requirement the auxiliary current $I'_{A1}$ emitted by electrode $A_1$ has to be substantially equal to current $I_{OD}$ received by electrode $A_1$. To this end the secondary windings of transformers 70-71 compare the measure current $I_{OD}$ flowing in winding 80 and impedance 64 with the auxiliary current $I'$ flowing in winding 82 and impedance 66. The secondary windings 84 and 86 of transformers 70-71 are connected in phase opposition so as to feed the inputs of amplifier 72 with a voltage which is proportional to the difference between $I'_{A1}$ and $I_{OD}$. Amplifier 72 then keeps the auxiliary current $I'_{A1}$ equal to and of opposite sign to measure current $I_{OD}$ so that the net current coming out of electrode $A_1$ is practically nil.

Figure 5:
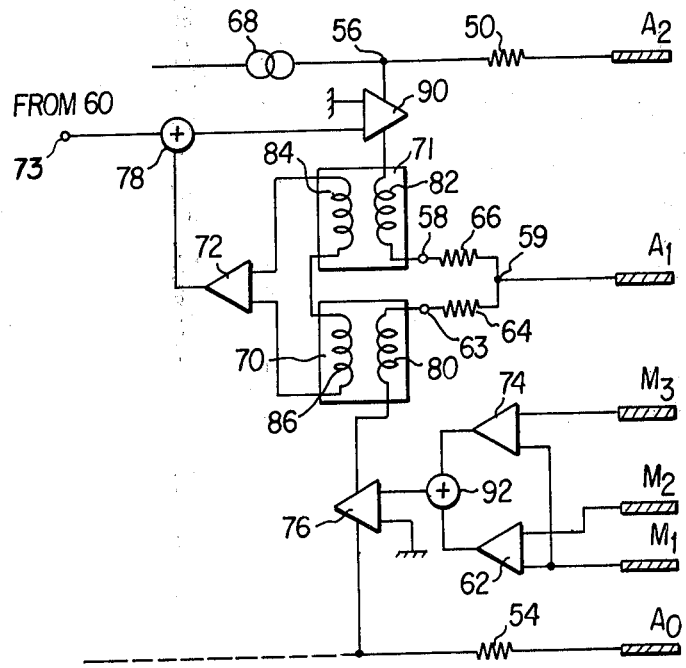
FIG. 5 represents schematically one-half of the electrode array of FIG. 1, with its associated circuits for simultaneous deep and shallow investigations.

In FIG. 5 there is represented one-half of an electrode system in accordance with the present invention and suitable for a dual mode of investigation which system results from a combination of the shallow investigation circuit represented in FIG. 3C, and the deep investigation circuit of FIG. 4. In this system electrode $A_2$ is connected to the second current (35 Hz) source 68 through impedance 50. A reference signal, representative of the first (280 Hz) current supplied by source 60, is applied to terminal 73 which is connected to one input of a summing element 78, e.g., an operational amplifier, another input of the element 78 being connected to the output of amplifier 72. The output of summing element 78 is connected to one output of a unity gain amplifier 90 whose other input is linked to a ground terminal. Two outputs of amplifier 90 are respectively connected to terminal 56 and to winding 82. Electrode $A_1$ is connected to windings 80 and 82 through respective impedances 64 and 66. Monitoring electrodes $(M_1,M_2)$ and $(M_1,M_3)$ are connected respectively to inputs of amplifiers 62 and 74, and the outputs of these amplifiers are, in turn, connected to the inputs of a summing circuit 92, e.g., an operational amplifier. The output of circuit 92 is connected to one input of a unity gain amplifier 76, while another input of the amplifier is grounded. Outputs of amplifier 76 are respectively connected to the primary winding 80 of transformer 70 and to impedance 54.

Functionally, the circuit of FIG. 5 operates as explained previously with regard to operation in shallow and deep investigation modes of the systems of FIGS. 3C and 4 respectively and will therefore not be further discussed.

Figure 6:
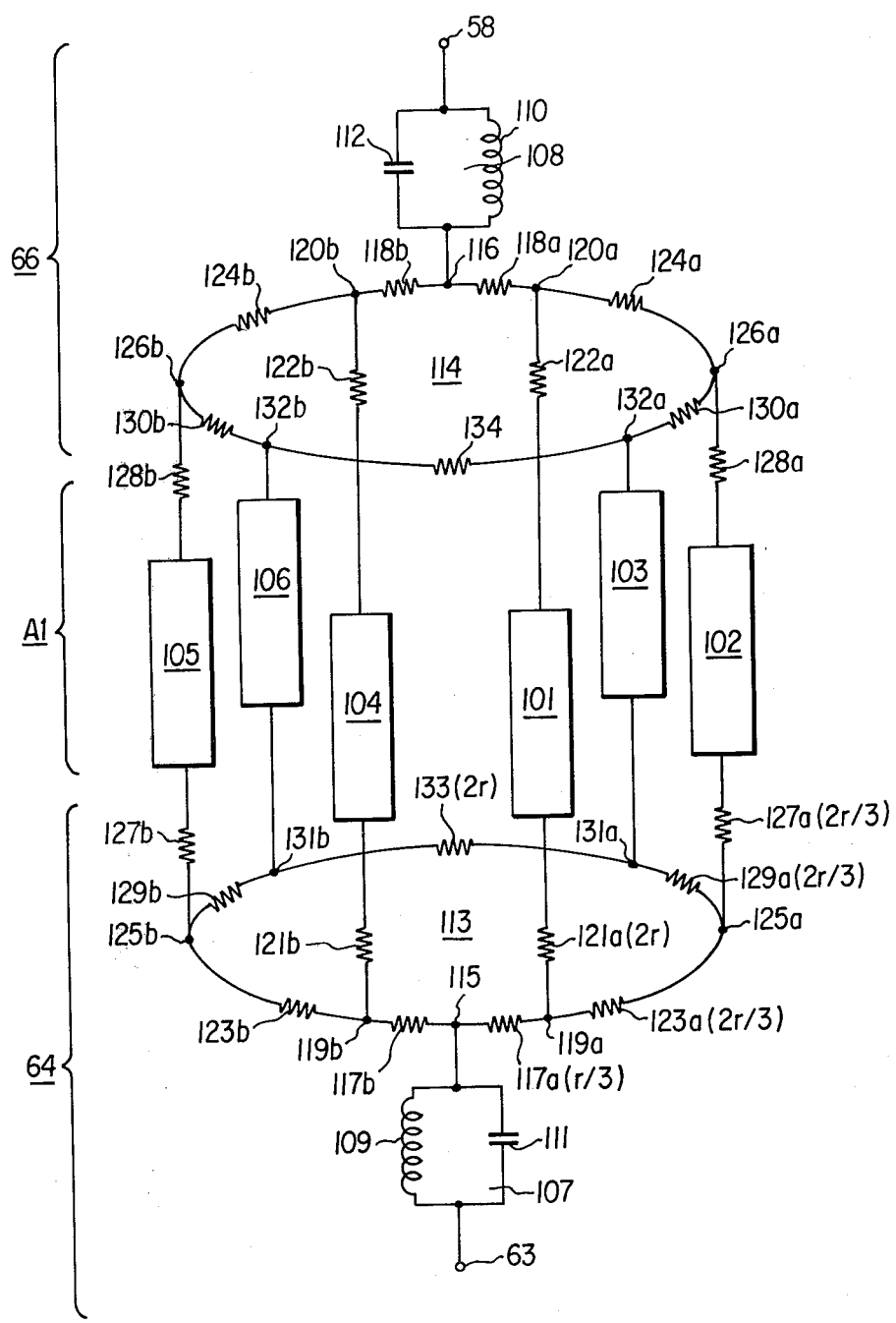
FIG. 6 represents a current electrode assembly for use in the embodiment of FIG. 1.

FIG. 6 represents the two selective composite impedances 64 and 66 associated with the auxiliary current electrode $A_1$ in the system of FIG. 5. Electrode $A_1$ is made up of six metal strips 101–106, placed on a flexible support (not shown). The impedances 64 and 66, are identical and each includes respective circuits 107 and 108 formed by the parallel connection of induction coils 109, 110, with respective capacitors 111, 112, in series with respective rings 113, 114.

Ring 113 is formed by the anti-clockwise serial connections of resistors 117a, 123a, 129a, 133, 129b, 123b and 117b each having the following respective values r/3, 2r/3, 2r/3, 2r, 2r/3, 2r/3 and r/3 (i.e., $r=1\Omega$). Strips 103, 106 are connected directly to the ring while strips 101, 102, 104 and 105 are coupled to the ring through respective impedances 121a, 127a, 127b and 121b having the following respective values 2r, 2r/3, 2r/3 and 2r. One terminal of capacitor 111 is coupled to the junction 115 of resistors 117a and 117b while strips 101–106 are coupled to the subsequent ring resistor junctions as one proceeds along the ring in an anti-clockwise direction.

Ring 114 is similar to ring 113 being coupled to opposite ends of strips 101–106. Reference numerals of ring 113 when incremented by one yield the elements of ring 114.

During logging operations strip-electrodes 101 to 106 are in contact with drilling mud and are thus at the same potential. Consequently, if one assumes that the inherent resistance of the strip-electrodes is negligible, terminal 115 is coupled to the mud through two parallel resistances each having a value r for a total resistance value of r/2. It will be noted that resistor 133 does not play any role in the current supply of the strip electrodes 101–106. In fact, as the strip-electrodes 103 and 106 are effectively connected through the mud, the function of the resistor 133 is basically to stabilize this connection and to present higher impedance for any induced high-frequency currents. With such resistive rings, the currents at the first and second frequency applied to the current electrodes are distributed equally between each of the six metal strips making up these electrodes.

A selective composite impedance (resonant circuit and resistive ring) identical to those described with reference to impedance 64 of FIG. 6 is placed in series with each of the other current electrodes of the electrode system of FIGS. 2 to 5.

While there have been described what are presently considered to be preferred embodiments of this invention, it will be obvious to those skilled in the art that various changes and modifications may be made therein without departing from the principles of the present invention which covers all such changes and modifications as fall within the true spirit and scope of the invention.

What is claimed is:

1. A well-logging method for measuring the electrical resistivity of two underground formation zones respectively near and far from a borehole, comprising the following steps:

applying at a first location of the borehole and receiving at two second locations of the borehole symmetrically situated on both sides of said first location along the borehole axis, a first measurement current at a first frequency, applying at two third locations of the borehole symmetrically situated on both sides of said first location along the borehole axis, between said second locations, and receiving at said second locations, a first focusing current at said first frequency, varying the amplitude of said first measurement current so as to minimize the potential difference existing at the first frequency between respective ones of two fourth and two fifth locations symmetrically situated along the borehole axos on both sides of said first location, between said two third locations, deriving a measure of the resistivity of a formation zone which is near the borehole from the amplitude of said first measurement current and from the potential difference existing at the first frequency between said two fourth locations and a sixth location along the borehole axis a very large distance from said first location, applying at said first location and receiving at a seventh location of the surface, a second measurement current at a second frequency, applying at said second locations and receiving at said seventh locations a second focusing current at said second frequency, varying the amplitude of the second measurement current so as to minimize the potential difference existing at said second frequency between said two fourth locations and two eighth locations respectively situated symmetrically on both sides of said first location between said third and fifth locations, deriving a measure of the resistivity of said zone far from the borehole from the amplitude of said second measurement current and from the potential difference existing at the second frequency between said fourth locations and said sixth location, inducing into the formation zones electromagnetic energy at a third frequency considerably higher than said first and second frequencies, deriving a measure of the currents at the third frequency induced in the formation zones and deriving therefrom a value for the conductivity of the respective formation zones, and modifying the flow conditions of said first and second focusing currents and said first and second measurement currents at said two third locations such that two independent flow paths are provided for respectively said first and second focusing currents and said first and second measurement currents.

2. Well-logging apparatus for measuring the electrical resistivities of two underground formation zones respectively near and far from a borehole, comprising:

a surface apparatus; a cable electrically and mechanically coupled to said surface apparatus; and an elongated sonde supported in the borehole by and electrically coupled to said cable, said sonde being equipped with a central current electrode, a first, a second, and a third pair of voltage electrodes, and a first and a second pair of current electrodes, each of said pairs of voltage and current electrodes being respectively arranged along the length of the sonde symmetrically in relation to said central electrode, said second pair of current electrodes being farther from said central electrode than said first pair of current electrodes, said first, second and third pairs of voltage electrodes being arranged between said central electrode and said first pair of current electrodes, respectively nearest to, intermediate to, and farthest from said central electrode;
a reference voltage electrode being supported on an insulated section of said cable, at a large distance from said sonde, and a distance current return electrode, located on the surface at a great distance from said sonde,
a first measurement current source at a first frequency, coupled between said central electrode and said first pair of current electrodes,
a first focusing current source at said first frequency, coupled between said first pair of current electrodes and said second pair of current electrodes, for focusing said first measurement current and for obtaining an effective coupling of said first measurement current source between said central electrode and said second pair of current electrodes,
means for measuring, in relation to said reference electrode, the potentials existing at said first frequency at said first and second pairs of voltage electrodes,
a first feedback loop for minimizing the potential difference existing at said first frequency between said first and second pairs of voltage electrodes, by varying the amplitude of said first measurement current,
means for deriving a measure of the resistivity of the near formation zones surrounding said borehole, from the amplitude of one of the potentials at said first frequency and the intensity of said first measurement current,
a second measurement current source at a second frequency effectively coupled between said central electrode and said distant current return electrode,
a second focusing current source at said second frequency coupled between said second pair of current electrodes and said distant current return electrode,
means for measuring, in relation to said reference electrode, the potential existing at said second frequency at said first and third pairs of voltage electrodes,
a second feedback loop for minimizing the potential difference existing at said second frequency between said first and third pairs of voltage electrodes by varying the amplitude of said second measurement current, and
means for deriving a measure of the resistivity of the far formation zones surrounding said borehole from the amplitude of one of the potentials at said second frequency and the intensity of said second measurement current,
wherein said second measurement current source at said second frequency is coupled between said central electrode and said first pair of current electrodes, and an auxiliary feedback loop capable of generating an auxiliary current at said second frequency with an amplitude equal to the amplitude of said second measurement current is coupled between said first pair of current electrodes and said second pair of current electrodes for obtaining the effective coupling between said central electrode and said distant current return electrode.

3. An apparatus as in claim 2, wherein the dimension along the axis of said sonde of the electrodes of said second pair of auxiliary current electrodes is very small relative to their spacing distance.

4. An apparatus as in claim 2 or 3, wherein each voltage electrode of said third pair of voltage electrodes is located on the sonde approximately midway between respective ones of the electrodes of said first pair of auxiliary current electrodes and said second pair of auxiliary voltage electrodes.

5. Well-logging apparatus according to claim 2, further comprising:
means for inducing into the formation zones electromagnetic energy at a third frequency much higher than said first and second frequencies, and
means for measuring the amplitude of the currents at said third frequency induced in said formation zones, wherein
each of said electrodes includes longitudinal conducting strips coupled by a resistive ring, coupled in series with a resonant circuit constituting both a high impedance circuit for the currents at said third frequency and a relatively low impedance circuit for said currents at the first and second frequencies, and
the electrodes of said first pair of auxiliary current electrodes are coupled to said first focusing current source and said first measurement current source through respectively separate resistive rings and resonant circuits.

6. An apparatus for the electrical investigations of earth formations traversed by a borehole, comprising:
an elongated support member,
a plurality of electrodes supported in spaced apart relationship along the length of said support member, including a central electrode, and two pairs of electrodes, the two electrodes of each pair being positioned about said central electrode,
a first source of electrical current,
first electrical impedance means connecting said two electrode pairs to said first source of electrical current so as to supply current to one of said electrode pairs and receive returned current from the other of said electrode pairs,
a second source of electrical current, and
second electrical impedance means connecting said central electrode and the one of said electrode pairs nearest said central electrode to said second source of electrical current so as to supply current to one of said nearest electrode pair and said central electrode and receive returned current from the other.

7. The apparatus of claim 6, wherein said plurality of electrodes further comprises:
an additional two pairs of electrodes, the two electrodes of each additional electrode pair being symmetrically positioned about said central electrode between said central electrode and said nearest electrode pair, and wherein said apparatus further comprises:
means for controlling said second source of current in accordance with the potential difference across said additional electrode pairs.

8. The apparatus of claim 6, wherein:
each of said electrodes comprises a plurality of conductive strips supported about a circumference of the support member, and wherein each of said impedance elements comprises a plurality of resistive impedances coupled to form a resistive ring through which said conductive strips are connected the one to the other, and a resonant circuit formed by the parallel connections of an inductive impedance and a capacitive impedance, said resonnant circuit being serially coupled with said resistive ring.

9. An apparatus for the electrical investigation of earth formations traversed by a borehole, comprising:
   an elongated support member,
   a plurality of electrodes supported in spaced apart relationship along the length of said support member, including a central electrode, and two pairs of electrodes, the two electrodes of each pair being symmetrically positioned about said central electrode,
   a first source of electrical current,
   first electrical impedance means connecting said two electrode pairs to said first source of electrical current so as to supply current to one of said electrode pairs and receive returned current from the other of said electrode pairs,
   a second source of electrical current,
   second electrical impedance means connecting said central electrode and the one of said electrode pairs nearest said central electrode to said second source of electrical current so as to supply current to one of said nearest electrode pair and said central electrode and receive returned current from the other, and
   means for controlling the output of said first source of current so as to provide a current flow through said first impedance means which is equal in magnitude and opposite in direction to the current flow through said second impedance means.

10. The apparatus of claim 9, wherein said plurality of electrodes further comprises:
    an additional two pairs of electrodes, the two electrodes of each additional electrode pair being symmetrically positioned about said central electrode between said central electrode and said nearest electrode pair, and wherein said apparatus further comprises:
    means for controlling the output of said second source of current in accordance with the potential difference across said additional electrode pairs.

11. An apparatus for the investigation of earth formations traversed by a borehole, comprising:
    an elongated support member,
    a plurality of electrodes supported in spaced apart relationship along the length of said support member, including a central electrode, and two pairs of electrodes, the two electrodes of each pair being symmetrically positioned about said central electrode,
    a first source of electrical current at a first frequency and a second frequency,
    first electrical impedance means connecting said two electrode pairs to said first source of electrical current so as to supply current to one of said electrode pairs and receive returned current from the other of said electrode pairs,
    a second source of electrical current at said first and second frequencies,
    second electrical impedance means connecting said central electrode and the one of said electrode pairs nearest said central electrode to said second source of electrical current so as to supply current to one of said nearest electrode pair and said central electrode and receive returned current from the other, and
    means for controlling the output of said first source of current so as to provide a current flow at first frequency through said first impedance means which is equal in magnitude and opposite in direction to the current flow at said first frequency through said second impedance means.

12. The apparatus of claim 11, wherein said plurality of electrodes further comprises:
    an additional two pairs of electrodes, the two electrodes of each additional electrode pair being symmetrically positioned about said central electrode between said central electrode and said nearest electrode pair, and wherein said apparatus further comprises:
    means for controlling the output of said second source of current at said second frequency in accordance with the potential difference across said additional electrode pairs.

13. The apparatus of claim 12, wherein said plurality of electrodes further comprises:
    a further additional pair of electrodes, the two electrodes of said further additional electrode pair being symmetrically positioned about said central electrode between said additional electrode pairs, and wherein said apparatus further comprises:
    means for controlling the output of said second source of current at said first frequency in accordance with the potential difference between said further additional electrode pair and the one of said additional electrode pairs nearest said central electrode.

14. The apparatus of claim 13, wherein each electrode of said further additional electrode pair is positioned on said support member approximately midway between respective electrodes of an adjacent one of said additional electrode pairs and said current electrode.

15. The apparatus of claim 11, wherein said plurality of electrodes further comprises:
    an additional two pairs of electrodes, the two electrodes of each additional electrode pair being symmetrically positioned about said central electrode between said central electrode and said nearest electrode pair, and wherein said apparatus further comprises:
    means for controlling the output of said second source of current at said first frequency in accordance with the potential difference across said additional electrode pairs.

16. The apparatus of claim 11, 12, 13, 14, or 15, further comprising:
    means, supported by said support member, for inducing at a third frequency electromagnetic energy, wherein the length, along the axis of the support member, of each electrode of said electrode pairs positioned farthest from said central electrode, is several orders of magnitude smaller than the relative spacing along the support member between respective electrodes of said farthest electrode pair.

17. The apparatus of claim 16 further comprising means for measuring the spontaneous potential of the earth formations traversed, said spontaneous potential measuring means including an electrode mounted on said support member.

18. The apparatus of claim 17 further comprising:
    means for detecting the induced electromagnetic energy,
    means for detecting the output current of said central electrode, means for detection the electrical potential generated at a predetermined one of said additional electrode pairs, and means capable of receiving respective outputs of said electromagnetic energy detecting means, said central electrode current detecting means, and said electrode potential detecting means for the recording thereof as a function of borehole depth.

19. An apparatus for the electrical investigation of earth formations traversed by a borehole, comprising:

an elongated support member, an electrode system, supported on said support member, comprising a central electrode and five pairs of electrodes respectively short-circuited and aligned symmetrically about said central electrode at increasing distances therefrom, the central electrode and the electrodes of the fourth and fifth pairs, the two electrode pairs most distant from said central electrode, being current electrodes, and the electrodes of the first, second and third pairs, the three electrode pairs closest to said central electrode, being voltage electrodes;

means for producing an alternating current at a first frequency, $f_1$, coupled between the electrodes of the fifth and fourth pairs;

means for producing an alternating current at a second frequency, $f_2$, coupled between the electrodes of the fifth pair and an electrode at electrical infinity with respect to the electrode system;

means, coupled between said central electrode and the electrodes of said fourth pair, for (1) maintaining the potential difference between the first and second pairs of electrodes at substantially zero by monitoring the potential difference between the first and second pairs of electrodes and adjusting the emission of current at said first frequency from the central current emitting electrode in response to the measured potential difference between the first and second pairs of electrodes to reduce the potential difference to zero, and for (2) maintaining the potential difference between the first and third pairs of electrodes at substantially zero by monitoring the potential difference between the first and third pairs of electrodes and adjusting the emission of current at said second frequency from the central current emitting electrode in response to the measured potential difference between the first and third pairs of electrodes to reduce the potential difference to zero; and first and second means, respectively interposed between each of said current producing means and said maintaining means and the fourth pair of current electrodes for providing significantly increased electrical impedance current therethrough having a frequency above $f_1$ and $f_2$.

20. The apparatus of claim 19 further comprising:

means for measuring the electrical potential proximate to one of the first, second and third pairs of electrodes and the current emitted from the central electrode at said two frequencies to produce therefrom signals representative of the electrical resistivity of the formation located at different lateral distances from the borehole, and means for providing a record of the output of said measuring means as a function of borehole depth.

21. The apparatus of claim 19 wherein said means for producing an alternating current at frequency $f_2$ is coupled between the fifth pair of current electrodes and the electrode at electrical infinity.

22. The apparatus of claims 19, 20 or 21, further comprising:

means, supported on said support member, for inducing at a third frequency $f_3$ electromagnetic energy, wherein:

the length, along the axis of the support member, of each of the electrodes of the fifth pair is several orders of magnitude smaller than the relative spacing along the support member of said fifth pair of electrodes.

23. The apparatus of claim 22, further comprising:

means, including an electrode mounted on said support member, for measuring the spontaneous potential of earth formations traversed.

24. An apparatus for investigating various zones of resistance of a formation in electrical communication therewith, the apparatus comprising:

an electrode array;

a supporting structure for supporting the electrodes of said electrode array in predetermined coaxial relationships, said electrode array having:

a central electrode for emitting measuring current;

a first electrode pair disposed symmetrically about said central electrode;

a second electrode pair disposed symmetrically about said central electrode, said first electrode pair being between the electrodes of said second electrode pair; and a plurality of electrode pairs, each pair being disposed symmetrically about said central electrode and between the electrodes of said first electrode pair, for measuring a potential difference across a selected two thereof;

a remote electrode at electrical infinity from said central electrode;

a reference electrode;

first current supply means, connected across said first electrode pair and said central electrode, for supplying current having respective frequencies $f_1$ and $f_2$ to said central electrode and receiving returned current from said first electrode pair, said first current supply means including a first current source capable of providing current of frequencies $f_1$ and $f_2$ and a first impedance having low reactive resistance to current of frequencies $f_1$ and $f2$ and high reactive resistance to current having a frequency greater than frequencies $f_1$ and $f_2$;

second current supply means, connected across said first and second electrode pairs, for supplying current having respective frequencies $f_1$ and $f_2$ to said first electrode pair and receiving returned current from said second electrode pair, said second current supply means including a second current source capable of providing current at frequencies $f_1$ and $f_2$ and a second inductance having low reactive resistance to current of frequencies $f_1$ and $f_2$ and high reactive resistance to current having a frequency greater than frequencies $f_1$ and $f_2$; and third current supply means, connected across said second electrode pair and said remote electrode, for supplying current having frequency $f_2$ to said second electrode pair and receiving current from said remote electrode;

so constructed and arranged that shallow investigation measuring current of frequency $f_1$ is emitted by said central electrode and collected by said first electrode pair, the magnitude thereof being controlled by said first current source in response to a difference in potential at frequency $f_1$ measured across a selected first pair of said measuring electrode pairs; and a shallow investigation focussing current of frequency $f_1$ having a magnitude substantially equal to the sum of the magnitudes of said shallow investigation measuring current and a theoretical shallow investigation focussing current is emitted by said first electrode pair and collected by said second electrode pair;

and that deep investigation measuring current of frequency $f_2$ is emitted by said central electrode and collected by said first electrode pair, the magnitude thereof being controlled by said first current source in response to a difference in potential at frequency $f_2$ measured across a selected second pair of said measuring electrode pairs; an auxiliary current of frequency $f_2$ having a magnitude substantially equal to the magnitude of said deep investigation measuring current is emitted by said first electrode pair and collected by said second electrode pair, the magnitude thereof being controlled by said second current source in response to the detected difference in magnitude between said deep investigation measuring current and said auxiliary current; and a deep investigation focussing current of frequency $f_2$ having a magnitude substantially equal to the difference in magnitude between a theoretical deep investigation focussing current and said auxiliary current is emitted by said second electrode pair and collected by said remote electrode.

25. An apparatus for investigating various zones of resistance of a formation in electrical communication therewith, the apparatus comprising:
   an electrode array;
   a supporting structure for supporting the electrodes of said electrode array in predetermined coaxial relationships, said electrode array having:
      a central electrode for emitting measuring current;
      a first electrode pair disposed symmetrically about said central electrode;
      a second electrode pair disposed symmetrically about said central electrode, said first electrode pair being between the electrodes of said second electrode pair; and
      a plurality of electrode pairs, each pair being disposed symmetrically about said central electrode and between the electrodes of said first electrode pair, for measuring a potential difference across a selected two thereof;
   a remote electrode at electrical infinity from said central electrode;
   a reference electrode;
   induction investigation means for determining the resistance of the formation by measuring the conductance thereof by electromagnetic energy of a predetermined frequencey, said electrode array being suitably disposed about said induction investigation means to minimize the effect thereof on said induction investigation means;
   first current supply means, connected across said first electrode pair and said central electrode, for supplying current having respective frequencies $f_1$ and $f_2$ to said central electrode and receiving returned current from said first electrode pair, said first current supply means including a first current source capable of providing current of frequencies $f_1$ and $f_2$ and a first impedance having low reactive resistance to current of frequencies $f_1$ and $f_2$ and high reactive resistance to the frequency of current tending to be induced by electromagnetic energy emitted by said induction investigation means;
   second current supply means, connected across said first and second electrode pairs, for supplying current having respective frequencies $f_1$ and $f_2$ to said first electrode pair and receiving returned current from said second electrode pair, said second current supply means including a second current source capable of providing current at frequencies $f_1$ and $f_2$ and a second inductance having low reactive resistance to current of frequencies $f_1$ and $f_2$ and high reactive resistance to the frequency of current tending to be induced by electromagnetic energy emitted by said induction investigation means; and
   third current supply means, connected across said second electrode pair and said remote electrode, for supplying current having frequence $f_2$ to said second electrode pair and receiving current from said remote electrode;
   so constructed and arranged that shallow investigation and deep investigation are capable of being performed simultaneously;
   that shallow investigation measuring current of frequency $f_1$ is emitted by said central electrode and collected by said first electrode pair, the magnitude thereof being controlled by said first current source in response to a difference in potential at frequency $f_1$ measured across a first selected pair of said measuring electrode pairs; and a shallow investigation focussing current of frequency $f_1$ having a magnitude substantially equal to the sum of the magnitudes of said shallow measuring current and a theoretical shallow investigation focussing current is emitted by said first electrode pair and collected by said second electrode pair; the output at frequency $f_1$ of said second current source being controlled so as to maintain substantially constant the product of the magnitude of said shallow focussing measuring current and a potential at frequency $f_1$ measured at a selected one of said first selected pair of measuring electrode pairs relative to said reference electrode;

and that deep investigation measuring current of frequency $f_2$ is emitted by said central electrode and collected by said first electrode pair, the magnitude thereof being controlled by said first current source in response to a difference in potential at frequency $f_2$ measured across a second selected pair of said measuring electrode pairs; an auxiliary current of frequency $f_2$ having a magnitude substantially equal to the magnitude of said deep investigation measuring current is emitted by said first electrode pair and collected by said second electrode pair, the magnitude thereof being controlled by said second current source in response to the detected difference in magnitude between said deep investigation measuring current and said auxiliary current; and a deep investigation focussing current of frequency $f_2$ having a magnitude substantially equal to the difference in magnitude between a theoretical deep investigation focussing current and said auxiliary current is emitted by said second electrode pair and collected by said remote electrode; the output at frequency $f_2$ of said third current supply means being controlled so as to maintain substantially constant the product of the magnitude of said deep investigation measuring current and a potential at frequency $f_2$ measured at a selected one of said second selected measuring electrode pairs relative to said reference electrode.

26. A method for investigation various zones of resistance of a formation comprising the steps of:
applying at a selected location within said formation a shallow investigation measuring current of frequency $f_1$;
receiving said shallow investigation measuring current being returned at a pair of first locations symmetrical about said selected location and coaxial therewith;
passing said shallow investigation measuring current through a first inductance having low reactive resistance thereto and high reactive resistance to electromagnetic energy of frequency significantly different than frequency $f_1$;
applying at said first locations a shallow investigation focussing current of frequency $f_1$ having a magnitude substantially equal to the sum of the magnitudes of said shallow investigation measuring current and a theoretical shallow investigation focussing current;
receiving said shallow investigation focussing current being returned at a pair of second locations symmetrical about said selected location, coaxial therewith, and outside of said first locations;
passing said shallow investigation measuring current through a second inductance having low reactive resistance thereto and high reactive resistance to electromagnetic energy of frequency significantly different than frequency $f_1$;
applying at said selected location a deep investigation measuring current of frequency $f_2$;
receiving said deep investigation measuring current being returned at said first locations;
passing said deep investigation measuring current through said first inductance, said first inductance further having low reactive resistance thereto;
applying at said first locations an auxiliary current of frequency $f_2$ having a magnitude substantially equal to the magnitude of said deep investigation measuring current;
receiving said auxiliary current being returned at said pair of second locations;
passing said auxiliary current through said second inductance, said second inductance further having low reactive resistance thereto;
applying at said second locations a deep investigation focussing current of frequency $f_2$ having a magnitude substantially equal to the difference in magnitude between a theoretical deep investigation focussing current and said auxiliary current; and
receiving said deep investigation focussing current being returned at a remote location at electrical infinity with respect to said selected location and said second locations;

27. A method as in claim 26, wherein:
said shallow investigation measuring current applying step comprises the step of controlling the magnitude of said shallow investigation measuring current in response to a difference in potential at frequency $f_1$ measured across a first pair of measuring locations symmetrical about said selected location, coaxial therewith, and between said first locations;
said shallow investigation focussing current applying step comprises the step of controlling the magnitude of said shallow investigation focussing current so as to maintain substantially constant the product of the magnitude of said shallow investigation measuring current and a potential at frequency $f_1$ measured at a selected one of said first pair of measuring locations;
said deep investigation measuring current applying step comprises the step of controlling the magnitude of said deep investigation measuring current in response to a difference in potential at frequency $f_2$ measured across a second pair of measuring locations symmetrical about said selected location, coaxial therewith, and between said first locations;
said auxiliary current applying step comprises the step of controlling the magnitude of said auxiliary current in response to the difference in magnitude between said deep investigation measuring current and said auxiliary current; and
said deep investigation focussing current applying step comprises the step of controlling the magnitude of said deep investigation focussing current so as to maintain substantially constant the product of the magnitude of said deep investigation measuring current and a potential at frequency $f_2$ measured at a selected one of said second pair of measuring locations.

28. A method as in claim 26 or 27 further comprising the step of simultaneously determining the resistance of the formation by measuring the conductance thereof by electromagnetic energy of a predetermined frequency significantly different than frequencies $f_1$ and $f_2$.

29. An apparatus for electrical investigation of the earth formations surrounding a borehole, comprising:
electrode means;
means for providing a supplemental current;
means for providing a focusing current;
means for providing a controled measurement current, said measurement current providing means being responsive to respective potentials arising from the electrical investigation of earth formations with said focusing current and said measurement current for controlling the magnitude of said measurement current to maintain the difference between said potentials at a predetermined value, including zero;
respective first impedance elements coupling said measurement current providing means to selected ones of said electrode means;
respective second impedance elements coupling said supplemental current providing means to selected ones of said electrode means; and
a third impedance element coupling said focusing current providing means to at least a selected one of said electrode means;
said first, second and third impedance elements being so constructed and arranged that the current flow through said first impedance elements consists of said measurement current and the current flow through said second impedance elements comprises said supplemental current, a low impedance being presented to said supplemental current, said focusing current, and said measurement current, for obtaining a practical equivalent to theoretical current paths for said focusing and measurement current.

30. An apparatus for the simultaneous electrical and inductive investigation of the earth formations surrounding a borehole, comprising:
- means for performing an inductive investigation of earth formations at a frequency $f_1$; and
- means for performing an electrical investigation of earth formations at a frequency or frequencies different than said frequency $f_1$ simultaneous with said inductive investigation, said electrical investigation means including:
- electrode means;
- means for providing a supplemental current;
- means for providing a focusing current;
- means for providing a controled measurement current, said measurement current providing means being responsive to respective potentials arising from the electrical investigation of earth formations with said focusing current and said measurement current for controlling the magnitude of said measurement current to maintain the difference between said potentials at a predetermined value, including zero;
- respective first impedance elements coupling said measurement current providing means to selected ones of said electrode means;
- respective second impedance elements coupling said supplemental current providing means to selected ones of said electrode means; and
- a third impedance element coupling said focusing current providing means to at least a selected one of said electrode means;
- said first, second and third impedance elements being so constructed and arranged that the current flow through said first impedance elements consists of said measurement current and the current flow through said second impedance elements comprises said supplemental current, a low impedance being presented to said supplemental current, said focusing current, and said measurement current, for obtaining a practical equivalent to theoretical current paths for said focusing and measurement current; and that current flow at frequency $f_1$ is suppressed by said first, second and third impedance elements, a high impedance being encountered by current of said frequency $f_1$.

31. An apparatus as in claim 29 or 30 further comprising:
- a current comparator responsive to said measurement current and said supplemental current for determining the magnitude of the difference therebetween; and
- an amplifier responsive to said difference magnitude to maintain said supplemental current at a magnitude equal and of opposite sign to said measurement current.

32. An apparatus for the simultaneous electrical and inductive investigation of the earth formations surrounding a borehole, comprising:
- means for performing an inductive investigation of earth formations at a frequency $f_1$; and
- means for performing an electrical investigation of earth formations at a frequency or frequencies different than said frequency $f_1$ simultaneous with said inductive investigation, said electrical investigation means including:
- an electrode array having a current electrode and first and second current electrode pairs, said first current electrode pair being intermediate the electrodes of said second current electrode pair and said current electrode being intermediate the electrodes of said first current electrode pair;
- means for providing a supplemental current of frequency $f_2$;
- means for providing a supplemental current of frequency $f_3$;
- means for providing a focusing current of a frequency $f_2$;
- means for providing a focusing current of a frequency $f_3$;
- means for providing a controled measurement current having current components of frequency $f_2$ for shallow electrical investigation and frequency $f_3$ for deep electrical investigation, said measurement current providing means being responsive to respective potentials at frequencies $f_2$ and $f_3$ arising from the electrical investigation of earth formations with said focusing current of frequencies $f_2$ and $f_3$ and said measurement current of frequencies $f_2$ and $f_3$ for controlling the magnitude of said measurement current to maintain the difference between the potentials at frequency $f_2$ and between the potentials at frequency $f_3$ at respective predetermined values, including zero;
- respective first impedance elements coupling said $f_2$ measurement current providing means to said current electrode and said first current electrode pair;
- respective second impedance elements coupling said $f_2$ focusing current providing means and said $f_2$ supplemental current providing means to said first and second current electrode pairs;
- said respective first impedance elements further coupling said $f_3$ measurement current providing means to said current electrode and said first current electrode pair;
- said respective second impedance elements further coupling said $f_3$ supplemental current providing means to said first and second current electrode pairs; and
- a third impedance element coupling said $f_3$ focusing current providing means to said second current electrode pair, said $f_3$ focusing current providing means additionally being coupled to an electrode at electrical infinity;
- said first, second and third impedance elements being so constructed and arranged that the current flow through said first impedance elements consists of the flow of said measurement current at frequencies $f_2$ and $f_3$, and the current flow through said second impedance elements comprises said supplemental current at frequencies $f_2$ and $f_3$, a low impedance being presented to current of said frequencies $f_2$ and $f_3$, to obtain a practical equivalent to theoretical current paths for said focusing and measurement current for deep and shallow investigation; and that current flow at frequency $f_1$ is suppressed by said first, second and third impedance elements, a high impedance being encountered by current of said frequency $f_1$.

33. An apparatus as in claim 32 further comprising:
- a current comparator responsive to said measurement current at a frequency $f_3$ and to said supplemental current at a frequency $f_3$ for determining the magnitude of the difference therebetween; and
- an amplifier responsive to said difference magnitude to maintain said supplemental current of frequency $f_3$ at a magnitude equal and of opposite sign to said measurement current of frequency $f_3$.

* * * * *

UNITED STATES PATENT AND TRADEMARK OFFICE
CERTIFICATE OF CORRECTION

PATENT NO. : 4,319,192

DATED : March 9, 1982

INVENTOR(S) : Roland Chemali; Jacques Tabanou

It is certified that error appears in the above—identified patent and that said Letters Patent is hereby corrected as shown below:

In the Specification, column 9, line 15-16, "principles the" should read --principles of the--; line 37, "inordinantly" should read --inordinately--. Column 10, line 32, "I'·" should read --$I'_{A1}$--.

In the Claims, column 12, line 13 (Claim 1) "axos" should read --axis--. Column 17, line 1 (Claim 18), "detection" should read --detecting--. Column 18, line 47 (Claim 24), "f2" should read --$f_2$--. Column 20, line 21 (Claim 25), "frequence" should read --frequency--. Column 21, line 7 (Claim 26), "investigation" should read --investigating--. Column 22, line 40 (Claim 29), "controled" should read --controlled--. Column 23, line 14 (Claim 30), "controled" should read --controlled--. Column 24, line 11 (Claim 32), "controled" should read --controlled--.

Signed and Sealed this

Twelfth Day of October 1982

[SEAL]

Attest:

GERALD J. MOSSINGHOFF

Attesting Officer    Commissioner of Patents and Trademarks